United States Patent Office 3,720,751
Patented Mar. 13, 1973

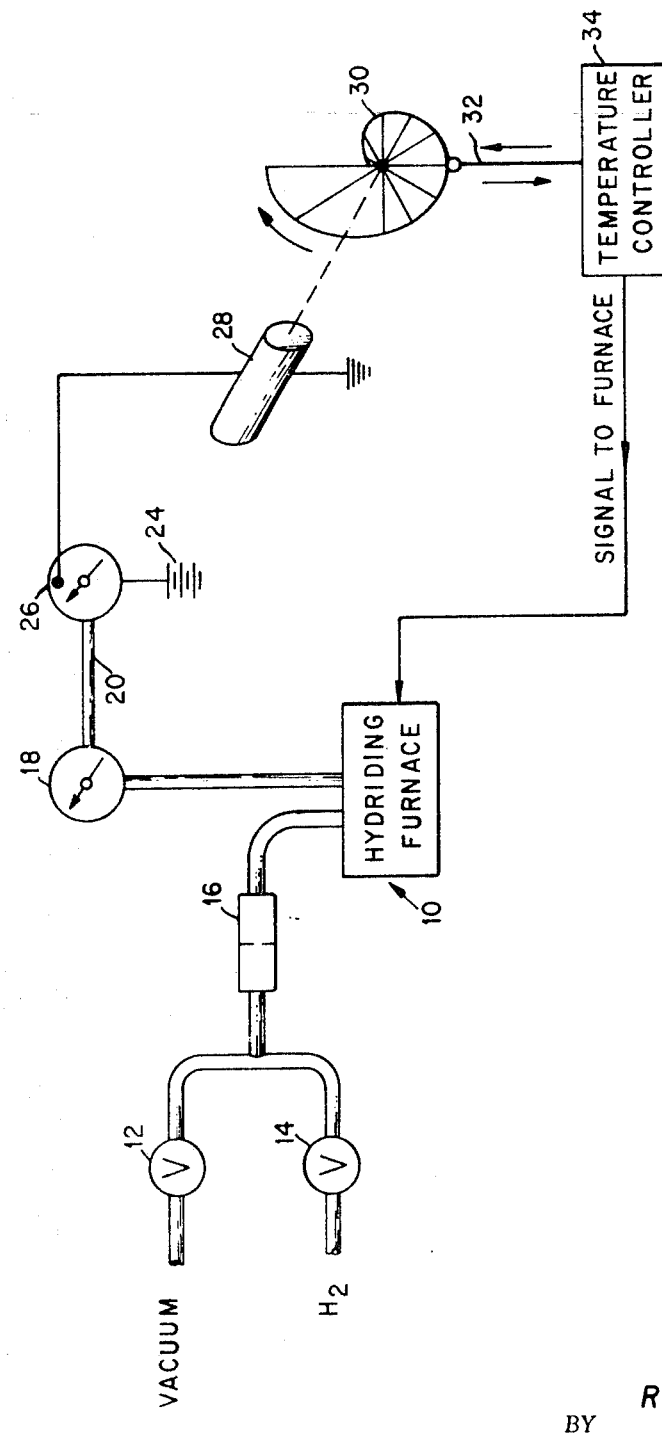

3,720,751
HYDRIDING PROCESS
Robert Van Houten, 7685 De Mar Road,
Cincinnati, Ohio 45243
Continuation-in-part of application Ser. No. 240,186,
Nov. 26, 1962. This application June 15, 1967,
Ser. No. 647,261
Int. Cl. C01b 16/00; C01f 15/00
U.S. Cl. 423—252         1 Claim

ABSTRACT OF THE DISCLOSURE

This invention relates to a method and means for controlling the hydrogen pressure in a furnace system for hydriding a metal or alloy workpiece to a massive hydride structure by (1) controlling the flow of hydrogen into said system at a rate which is less than the maximum rate of hydrogen absorption by the work, and (2) holding the furnace temperature constant during a period of thermal arrest by the work.

---

This invention is a continuation-in-part of my copending application, Ser. No. 240,186, filed Nov. 26, 1962, now abandoned, and is copending to my application Ser. No. 634,019, filed Apr. 11, 1967, the disclosures of which are hereby incorporated by reference.

The invention described herein was made in the course of, or under a contract with the U.S. Atomic Energy Commission.

BACKGROUND OF THE INVENTION

The present invention relates to a method and means for converting pre-shaped massive metals and alloys to hydrided, deuterided, or tritided massive shapes having high and uniform hydrogen density. More particularly, this invention relates to the conversion of massive structures made from metals and alloys into crack-free, uniformly hydrided, deuterided, or tritided products. The present invention also relates to a method suitable for making massive, sound hydrided bodies of virtually any hydridable alloy whose phase relationship and pressure-composition-temperature (P–C–T) relationships are not well known.

Until the present invention, sound massive bodies of mixtures of hydridable materials could seldom, if ever, be produced until the phase relationships and the pressure-composition-temperature relationships had been investigated exhaustively. Also even the extensively investigated hydrides of zirconium and titanium and alloys thereof could seldom be reproducibly prepared in sound massive form from large fabricated shapes of the metal or alloy. When the metal or alloy was originally present in pieces of substantial size, cracks, or voids would occur during hydriding which would eventually result in the production of a fragmented hydride product.

The main difficulty in preparing solid bodies of almost any metal hydride, results from the large volume increase during hydriding, complicated by the phase transformations which accompany the hydriding process. Thus, in the case of zirconium, the transformation between the beta and delta zirconium hydride involves a significant volumetric expansion together with crystalline rearrangement from a body-centered cubic structure to one which is face-centered cubic. During and subsequent to such a phase change, the workpiece is subjected to severe internal and surface stresses which result in fracturing and ultimate production of a fragmented or even powdered rather than a massive product, especially if the phase changes are surface localized rather than simultaneously occurring throughout the volume of the workpiece.

It is characteristic of most metal hydrides that excessive hydride grain size usually results when massive metal bodies are isothermally hydrided at very high temperatures by pumping hydrogen into the bodies (from one or more faces of the work) so that initial nucleation of a new hydride phase containing a higher hydrogen level than the previous phase occurs at the outer surface, with an undesirable directional grain growth, usually columnar, progressing, wave like, from these nucleation sites.

It is further characteristic of the hydrides of this invention that at a given partial pressure of hydrogen, they will hold increasing amounts of hydrogen per unit volume of metal as the temperature is lowered. Thus, for example, an examination of zirconium-hydrogen absorption isotherms (in a graph of hydrogen concentration in zirconium plotted against pressure for a number of different temperatures) will show that the maximum concentration of hydrogen which can be obtained in the metal or alloy at a given hydrogen pressure increases as the temperature decreases. It, therefore, suggests itself that one can maximize the amount of hydrogen in a body by lowering its temperature while maintaining a given hydrogen pressure.

Since the boundary between phases in many of these hydrides (e.g., the boundary between the beta and beta plus delta phases of hydrogen-zirconium) is not vertical on a temperature-composition plot, the lowering of temperature of a fixed composition body until a phase boundary is crossed will normally cause nucleation of the new phase at numerous sites within the body. However, if the temperature drop is insufficient to cause or allow time for a significant degree of nucleation within the body, or if there is a strong, simultaneous columnar grain growth of large grains as opposed to a fine equiaxed structure, there may be little or no benefit from the multiple site nucleation effect. Further, the absorption of hydrogen by these bodies is an exothermic reaction and the local evolution of heat leads to further development of thermal, and, hence, hydrogen gradients in the body.

The pressure-composition-temperature (P–C–T) relationships of the hydrides are such that a slight reduction in local temperature results in a significant increase in the local equilibrium hydrogen content for a given contiguous surface hydrogen pressure. The heat released by the local absorption of additional hydrogen temporarily prevents further local temperature decrease despite a constant or even increasing differential in temperature between the workpiece and the cooler furnace retort wall. This condition, which exists when the workpiece temperature no longer drops in the presence of a thermal gradient between the workpiece and the retort wall, is known as a "thermal arrest" and the behavior is analogous to that which is often observed during the phase changes which occur in the course of a differential thermal analysis. If, during the time occupied by the thermal arrest or by the absorption of hydrogen at other times, the heated retort vessel containing the cooling hydriding body has continued to cool down, the result will be that, at the end of the thermal arrest which accompanies rapid hydrogen absorption, the work will be left considerably hotter than its immediate surroundings, i.e., the retort or the work holder. Therefore, the rate of cooling of the work surface becomes considerably accelerated, especially if power to the furnace retort has been reduced concomitantly. This leads to an accelerated rate of hydrogen absorption to such an extent that the external surface of the work will be hydrided or even undergo a phase change at a much faster rate than the internal volume of the work which sees little, if any, hydrogen. This condition is particularly acute with metals from Group IVa (Ti, Zr, Hf) which absorb hydrogen so rapidly as to cause localized volume changes of in excess of 100% per minute. It is clear that unless the hydrogen absorption rate is controlled, a uniformly hydrided crack-free product will be exceedingly difficult to obtain because hydrogen absorption and the phase changes, (e.g., from a ductile beta to a brittle phase) will be localized at or near the surface of the body resulting in high stresses and strains and unwanted large columnar grains such as to disrupt the physical integrity of the finally hydrided product.

The same situation applies during periods of hydrogen absorption which are not accompanied by a phase change. Because hydrogen absorption is exothermic, steep temperature gradients will be generated within the work, particularly as the size of the work specimen is increased. If the furnace retort temperature were continuously decreasing during the time of large hydrogen absorption, the hydride specimen surfaces would, by transferring radiant energy to the surface wall, experience a relatively rapid surface cooling of the work. This, in turn, would lead to still more hydrogen uptake and the accompanying volume expansion would occur at a time when the center of the specimen was at an appreciably higher temperature than the surface. The center of the work would then go into tension compared with the outer shell leading to further increases in the probability of internal cracking, especially at a time when brittle delta and epsilon phases were being produced.

SUMMARY OF THE INVENTION

Therefore, in order to produce a massive crack-free hydrided product at temperatures where maximum hydrogen absorption occurs, it is necessary, and it is the principal object of this invention to provide means to allow the diffusion of hydrogen to take place at such a rate during periods of thermal arrest (whether caused by phase changes or by rapid hydrogen absorption) or at other times of adversely large hydrogen absorption, such that hydriding takes place fairly uniformly within the volume of the work as well as at its surface, and preferably in a manner that does not lead to large crystal size.

The present invention deals with the problems of excessive hydrogen absorption and the attendant rupture or cracking by providing a hydriding system which combines a programmed, slowly varying hydriding temperature cycle and a fixed upper-limit, demand-flow hydrogen supply, in which the hydriding temperature cycle is interrupted (i.e., the temperature is temporarily held constant) whenever a given hydrogen absorption rate is exceeded as reflected by a discrete drop in hydrogen pressure in the system. Interruption or control of the temperature reduction is accomplished by limiting the maximum flow of hydrogen into the retort to a rate that is slower than the hydrogen absorption rate during periods of extensive absorption. The resulting drop in system pressure can then be used either as a visual or automated signal to indicate that no further temperature adjustment should be made, while the system pressure remains depressed. The method of this invention therefore proposes (a) to reduce the furnace hydrogen pressure during periods of excessive hydrogen absorption by the work, and (b) to interrupt the gradual reduction in furnace temperature at any time when the rate of hydrogen absorption by the work exceeds some preselected value.

In order to control the temperature cycle reduction at periods of excess of hydrogen absorption, particularly as the work is passing through a phase change as evidenced, for example, by the existence of a thermal arrest, the present invention contemplates a hydriding system comprising (1) a flow control valve or flow-limiting orifice(s) set so that the maximum permissible flow into a retort containing the workpiece to be hydrided is slower than the rate of hydrogen absorption by the work; (2) a manual or automatically programmed temperature cycle for controlling temperature over a period of hydriding; (3) pressure sensing means for detecting hydrogen pressure in the retort and preferably close to the work; and (4) switching means actuated by the pressure sensing means for delivering a signal to a furnace power supply, which signal is a preset function of the pressure change in the retort.

What this invention does then is to recognize automatically the point(s) in the hydriding cycle at which the temperature reduction should be interrupted, and, simultaneously to recognize automatically the point(s) at which the system hydrogen pressure should be reduced, and to accomplish each simply, automatically, inexpensively, and simultaneously.

When the hydrogen in the retort is absorbed by the work, a pressure differential created across a pre-set throttling valve (or flow-limiting orifice) will result in further hydrogen supply being fed into the retort so that hydrogen demand by the work will be continuously satisfied, but at a controlled maximum rate, if further hydrogen absorption is required to reach a desired hydrogen density.

The valve of this invention as a means for converting pre-shaped metals or alloys to correspondingly pre-shaped crack-free hydride shapes will particularly occur during and after the time that part or all of the work passes through a phase change—especially if there is a wide disparity in density between the phases. As has previously been noted, during the time occupied by hydrogen absorption, during a phase change or otherwise, the work will lose heat by radiation and conduction to the walls of the retort in which the work is contained. It is easy to see that if the work is absorbing hydrogen very rapidly and/or is experiencing a phase change, and, hence a thermal arrest, the temperature of the work will have been kept fairly constant with the result that at the end of the thermal arrest period, the work is left considerably hotter than its immediate surroundings. And, if during the time of the thermal arrest of the work, the cooling of the retort has also continued, the rate of cooling of the work surface will then be considerably accelerated, leading to a condition which allows excessive hydrogen absorption and concentration changes at the work surface. Without the control exercised by the system proposed by my invention, the workpiece will soon crack and even be converted to fragments due to the tremendous strains experienced in converting some of the metal to a brittle, e.g., delta or epsilon (or gamma, for some elements or alloys) phase while other portions of the workpiece are in a ductile phase having a different crystallographic orientation.

The concept of temperature control and restriction of hydrogen flow during and immediately after periods of thermal arrest or other times of normally excessive hydrogen absorption will allow time for redistribution of the hydrogen into the internal volume of the work before the concentration in the surface layer increases excessively so that the excessive strains such as those experienced during a phase change will have been ameliorated. The net result of temperature and hydrogen flow control has been that large pieces having a minimum diameter as much as ten inches and a total surface area in excess of 0.5 square meter have been converted to a crack-free massive uniformly hydrided structure to hydrogen densities which heretofore have been unobtainable without extensive cracking.

At this point, it should be noted that not all periods of rapid hydrogen absorption by metals or alloys are deleterious from the point of view of obtaining a crack-free hydride structure. For example, zirconium can be hydrided at temperatures above about 570° C. and by reference to the zirconium-hydrogen phase diagram, one can easily see that alpha zirconium will be converted to beta zirconium. This change in phase will generally not produce a warpage or cracks as a beta phase product. However, it should be noted that if the work temperature is too high, the rate of beta phase grain growth and terminal beta grain size may be excessive. Then, by an examination of the zirconium hydrogen absorption isotherms and the zirconium hydrogen phase diagram one can see that the hydriding of zirconium can be continued to convert all of the zirconium to the beta phase up to the point in the phase diagram indicating onset of the delta-containing phase. Prior experience has shown that the conversion of zirconium to zirconium hydride in the beta phase can be accomplished even with large rates of hydrogen absorption provided the material is equilibrated for a period of time to ensure complete conversion to a composition of uniform hydrogen content. Once the material is completely in the beta phase it is then converted to the delta phase at a controlled rate in accordance with the invention at a temperature and pressure necessary to reach a desired hydrogen density.

The nice and singularly important advantage of this invention is that it permits the production of large crack-free massive hydrogen alloys of complex composition whose pressure-temperature-composition relationships are unknown.

The benefits of my invention will also be reached in synthesizing hydrogen alloy systems whose phase diagram and pressure-temperature-composition relationships have been fairly well worked out, as in the case with zirconium and titanium. Specifically, the advantage lies in that crack-free hydrided specimens can be obtained with $N_H$ values previously regarded as unfeasible because the conditions indicated for maximum hydriding occurred at temperatures of minimum hydrogen diffusion rates. Therefore, prior investigators have normally operated at temperatures where the hydrogen diffusion rate was large in order to complete a uniformly hydrided structure. However, operation at the higher temperatures was precluded obtaining hydrided structures having a maximum hydrogen content obtainable at lower temperatures and previous efforts to hydride large pieces to high hydrogen contents at the required lower hydriding temperatures usually led to cracked products. Too, even with equipment and procedures proposed by my invention, a large size specimen may sometimes take several hundred hours to form a completely hydrided structure. By incorporating an automated temperature program in a hydriding system where flow limitation is used so that the maximum flow of hydrogen into a retort chamber is slower than the maximum absorption rate of the work, and by interrupting the retort temperature change during any reduction in hydrogen pressure in said chamber which exceeds a preset limit, the entire hydriding can function virtually unattended to produce a substantially crack-free structure hydrided to a desired hydrogen density whether or not anything is known of the P–T–C relationships for the materials.

Compositions which have been successfully hydrided (or deuterided) using the disclosed invention and/or equipment include: Ti, Zr, Th, Hf, V, Nb, Ta, Y, Dy, Gd, Ce, Sm and alloys of the aforementioned metals such as Th–Y, Th–Zr, V–Ti, Y–Cr, Ti–Al–V, Ti–Al–Sn, and Gd–Y in all proportions. For many of these compositions, particularly in the larger size specimens, incorporation of the grain growth inhibiting additives disclosed in my copending application, Ser. No. 240,186 (the disclosure of which is hereby incorporated by reference), will greatly increase the sizes which can be made without cracking or will greatly increase the permissible rate of hydrogen, deuterium, or tritium introduction.

The invention will be clearly understood from the accompanying figure which is a schematic drawing of a system which can be used to conduct hydriding of a metal workpiece virtually unattended, on an automatic basis.

In operation, a metal workpiece to be hydrided is placed in furnace 10. The system is outgassed at elevated temperatures during application of vacuum through valve 12. After outgassing, hydrogen is introduced through valve 14 and through a flow-limiting orifice of preset valve 16. The setting of the orifice or valve is such as to limit the hydrogen flow into the retort to a rate which is less than the maximum rate of hydrogen absorption by the workpiece. A furnace atmosphere pressure gauge 18, which may be a Bourdon-tube gauge measures the pressure in the retort. The furnace pressure gauge 18 is connected by line 20 to a pressure operated switch 22 energized by power supply 24. Switch 22 may be single pole-single throw type of electrical switch, which, as shown, is normally open at any pressure below a preset pressure. Above a preset pressure the furnace pressure actuates the switch contact with a preset point 26 to thereby close a circuit causing current to flow and energize a temperature programming drive system consisting of a clock motor and gear train assembly 28 which drives a cam 30. A cam follower arm 32 is positioned to contact the surface of the rotating arm and completes the circuit to a temperature controller unit 34 which functions to reduce (or increase) furnace temperature as a function of time. The furnace temperature cycle is controlled by the way the cam is cut. Since the cam drive is in series with the pressure gauge switch, it will be seen that the cam is driven only when the switch is closed.

The switch 26 stays open whenever a change in hydrogen pressure falls below some preset level, for example, 30–50 mm. less than the hydrogen line pressure. When the circuit is open, no current will flow and the temperature programmer is inoperative—that is to say, the furnace control will hold at the level existing when the current last flowed to the temperature program drive motor.

EXAMPLE

A typical example of the use of the hydriding system will now be described.

A 2.8" (nominal) O.D., 0.95" (nominal) I.D. zirconium cylinder 10" in length and weighing approximately 11 lbs. is abrasive blasted, dimensioned, wrapped in tantalum and titanium foils to provide "gettering" action and is inserted into a hydriding furnace, preferably one with a minimum free volume. The cover on the furnace is bolted, the gasket seal is checked, and the furnace is evacuated. The electrical power is turned on.

After the furnace has attained and soaked under vacuum at a temperature of 1900° F. for two hours, the temperature programming cam is positioned. The hydrogen supply is turned on at a flow rate equal to 1 cu. ft./hour, the pressure sensitive switch is set at 800 mm. Hg abs. (for an 850 mm. gas supply line pressure) and the hydriding cycle is now under way. At this flow rate setting, the hydrogen flow into the furnace will remain relatively unchanged for about 12 hours. Then the pressure in the furnace will begin to rise slowly indicating the onset of hydrogen saturation by the work. The indicated flow rate into the furnace will remain relatively constant for the next few hours until the furnace pressure has exceeded about 500 mm. Hg abs. At this time, the pressure across the flow limiting orifice will have dropped below a critical value of 7.5 p.s.i., equivalent to about 388 mm. Hg. Below this level, the effective flow rate varies approximately as the square root of the differential pressure across the orifice. Accordingly, the flow through the orifice will now slowly decrease as the chamber pressure rises above 500 mm. Hg. When the furnace pressure reaches 800 mm. Hg, the flow rate will be only one or two tenths of a cu. ft./hour.

At this point the pressure switch closes, allowing current to flow through the programmer motor. The programmed temperature now reduces at a steady pre-set rate of about −20° F./hour. The rate of flow into the furnace through the limiting orifice at the differential pressure of 50 mm., i.e., about 0.2 cu. ft./hour or less, will be approximately equal to the rate of hydrogen absorption by the work during the next several hours. When the furnace temperature has fallen to about 1650° F., the rate of hydrogen absorption by the work will increase rapidly, exceeding the 0.1 to 0.2 cu. ft./hour inlet rate for the 50 mm. differential pressure across the limiting orifice. Therefore, the work chamber pressure will start to fall and the programmed temperature decrease will be interrupted (perhaps for 3 or 4 hours, or longer) until the pressure of the furnace rises back to 800 mm. because of the, by then, reduced rate of hydrogen absorption by the work. The programmed temperature is then reduced steadily for several more hours until the temperature has fallen to 1600° F., at which time the rate of hydrogen absorption will increase, driving the furnace pressure down, opening the pressure switch, and again interrupting the operation of the temperature programmer for several hours until the rate of hydrogen absorption once more subsides and the furnace pressure again rises to 800 mm. Hg.

Similar interruptions in the programmed reduction of the hydriding furnace temperature will occur at about 1540° F., 1500° F., 1420° F., and 1340° F. After this, shorter interruptions of the cycle will usually occur at 1300° F., 1250° F., 1180° F., 1140° F., and 1120° F. Based on the way the cam is cut, the furnace temperature cycles on down to 1040° F., where it is allowed to remain for 24 hours. The total cycle from the start of hydrogen flow has now taken about 140 hours. During the final 24-hour soak, the work chamber pressure slowly rises to and remains at about 850 mm. pressure, equating itself with the line pressure. The hydrogen supply is then cut off and the piece is either cooled following the isochore down or using the stepwise reduction in retort pressure method described in my copending patent application. In the present case, the finished hydrided zirconium piece when removed was crack free with a hydrogen concentration of 2.03 w./o. hydrogen equivalent to an $N_H$ value of $6.86 \times 10^{22}$ atoms of hydrogen/cm.$^3$.

What is claimed is:
1. A method for forming a shaped hydrided body from a metal or alloy workpiece which comprises:

(1) heating the workpiece in a furnace to a predetermined temperature;
(2) continuously introducing hydrogen into the furnace from a constant pressure hydrogen supply and allowing the workpiece to absorb hydrogen to an equilibrium condition;
(3) reducing the temperature of the furnace until the hydrogen pressure in the furnace reaches a preselected fraction of the hydrogen supply pressure;
(4) maintaining the workpiece at the lower temperature until the equilibrium condition for that temperature is reached;
(5) repeating the temperature reduction-hydrogen saturation cycling until a desired degree of hydriding is achieved; and
(6) cooling the hydrided body to ambient temperature.

References Cited
UNITED STATES PATENTS

| | | | |
|---|---|---|---|
| 2,425,711 | 8/1947 | Alexander | 23—204 |
| 3,018,169 | 1/1962 | Vetreno | 23—204 |
| 3,070,526 | 12/1962 | Merten | 23—204 X |
| 3,135,697 | 6/1964 | Simnad et al. | 23—204 X |
| 3,154,845 | 11/1964 | Simnad | 23—204 X |

CARL D. QUARFORTH, Primary Examiner

F. M. GITTES, Assistant Examiner

U.S. Cl. X.R.

423—255, 645; 252—301.1 R